(12) United States Patent
Hauptmann (10) Patent No.: US 7,922,981 B2
(45) Date of Patent: Apr. 12, 2011

(54) DISPERSION-INTENSIFIED, COALESCENCE-INTENSIFIED CHEMICAL REACTOR AND METHOD

(75) Inventor: Edward G. Hauptmann, West Vancouver (CA)

(73) Assignee: Anilitics Process Chemistry & Engineering, Inc., West Vancouver, B.C. (CA)

( * ) Notice: Subject to any disclaimer, the term of this patent is extended or adjusted under 35 U.S.C. 154(b) by 0 days.

(21) Appl. No.: 12/418,415

(22) Filed: Apr. 3, 2009

(65) Prior Publication Data

US 2009/0191103 A1     Jul. 30, 2009

Related U.S. Application Data

(63) Continuation of application No. 11/260,026, filed on Oct. 26, 2005, now abandoned.

(60) Provisional application No. 60/622,264, filed on Oct. 26, 2004.

(51) Int. Cl.
| | |
|---|---|
| B01J 8/04 | (2006.01) |
| B01J 10/00 | (2006.01) |
| B01J 19/00 | (2006.01) |
| B01J 12/00 | (2006.01) |
| B01F 5/06 | (2006.01) |

(52) U.S. Cl. ........ 422/228; 422/129; 422/224; 422/648; 366/336; 210/511

(58) Field of Classification Search .................. 422/228, 422/200, 195, 224, 231, 129; 366/336, 341; 55/434; 239/432, 590.5; 210/511
See application file for complete search history.

(56) References Cited

U.S. PATENT DOCUMENTS

| | | | |
|---|---|---|---|
| 4,994,242 A | 2/1991 | Rae et al. | |
| 5,500,116 A | 3/1996 | Nakayama et al. | |
| 5,616,818 A | * 4/1997 | Pirkl et al. | .................... 568/932 |
| 6,506,949 B2 | 1/2003 | Gillis et al. | |

FOREIGN PATENT DOCUMENTS

| | | | |
|---|---|---|---|
| EP | 0779270 | | 6/1997 |
| SU | 816480 B | * | 4/1981 |

* cited by examiner

*Primary Examiner* — Walter D Griffin
*Assistant Examiner* — Natasha Young
(74) *Attorney, Agent, or Firm* — Kolisch Hartwell, P.C.

(57) ABSTRACT

Apparatus for intensifying heterogeneous chemical reactions is described. For the case of liquid-liquid reactions, with drops of a reactant distributed throughout the second continuous reactant, the physical phenomena of drop dispersion (break up) and drop coalescence are identified as the main physical steps affecting reaction rates. A basic flow cell structure is described in which the respective actions of dispersion and coalescence can be greatly intensified through the creation of enhanced body forces and shear flow zones. The basic cell structure can be arranged into pipe flow reactors to suit any production or process requirements. The basic cell structure is equally applicable to gas-liquid reactions with drops of one reactant being conveyed by a moving gas stream.

25 Claims, 8 Drawing Sheets

FLOW

FIG. 17

DISPERSION-INTENSIFIED, COALESCENCE-INTENSIFIED CHEMICAL REACTOR AND METHOD

CROSS-REFERENCE TO RELATED APPLICATION

This application is a continuation under 35 U.S.C. § 120 of U.S. patent application Ser. No. 11/260,026, filed Oct. 26, 2005, which in turn claims the priority under 35 U.S.C. §119 and applicable foreign and international law of U.S. Provisional Patent Application Ser. No. 60/622,264 filed Oct. 26, 2004. Both applications are hereby incorporated by reference in their entirety.

FIELD OF THE INVENTION

This invention relates to an apparatus and method to allow for heterogeneous chemical reactions. The invention finds application in reactions where the reactants are immiscible. The invention is of particular application in the nitration of aromatic hydrocarbons using mixed acids in aqueous solution.

BACKGROUND OF THE INVENTION

Heterogeneous chemical reactions are an important class of industrial processes in which the reactants are separate and to a large extent mutually insoluble. Many combinations of phases and dispersions are possible. Two of the more common arrangements are: liquid-liquid reactants with one liquid as a continuous phase having the second liquid dispersed throughout, generally in the form of drops; and, liquid-gas reactions with gas the continuous phase having drops of the liquid reactant dispersed throughout. In some cases the reactions are aided by the presence of a catalyst, either in homogeneous or heterogeneous form.

Two important examples of heterogeneous reactions are: nitration reactions, where typically an aromatic compound is dispersed throughout a solution of mixed acids; and desulfurizations, where a sulfur-laden hydrocarbon is sprayed into a hydrogen environment and passed over a catalyst bed. In the former example of nitration reactions, the mixed acids are usually nitric and sulfuric acid, with the sulfuric acid playing the role of a de facto catalyst, dissociating the nitric acid and forming a nitronium ion which comprises the reactive species.

An important example of an industrial nitration process is the nitration of benzene in a nitric-sulfuric acid mix to form mononitrobenzene (MNB), a precursor in the production of polyurethanes, among other important products. Another example, amongst many, is the nitration of toluene to dinitrotoluene, also a precursor in polyurethane production.

Reactions in heterogeneous systems generally take place near the interface between the reactants. For example in the case of liquid-liquid reactants, with one dispersed as drops throughout the second continuous reactant, it is well established that the actual reactions take place in the continuous phase just beyond the surface of the drop. This is also evident in the case of liquid-gas reactions such as normal combustion processes, where the fuel drop vaporizes into the surrounding oxygen rich mixture of gases, and the subsequent reaction occurs in the gas phase.

In the aforementioned simple liquid-gas combustion process, the drop of fuel continues to volatilize, the combustion products are swept away in the continuous phase, and the burning continues. Liquid-liquid reactions are somewhat more complex, as the reaction products formed near the interface must find their way into either of the reactants by diffusion or with the aid of other mass transfer phenomena. As the products of the reaction may remain in the reaction zone for a considerable time, the rate at which fresh reactants can be brought to the reaction zone is limited and the reaction slows.

Figure 1:
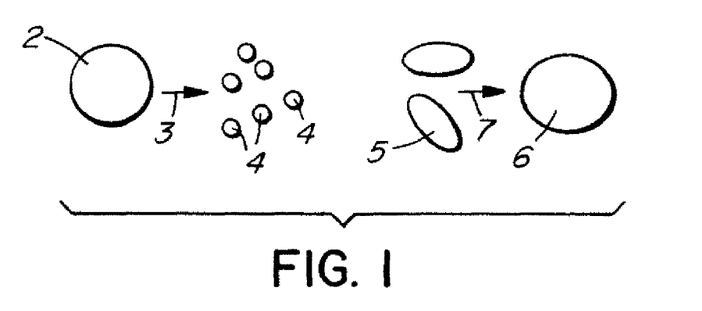
FIG. 1 shows schematically the dispersion and coalescence of reactant drops which is the principle on which the apparatus of the present invention is based.

The overall rate of reaction in liquid-liquid systems in particular can be increased by intensifying the two distinct steps of the process: dispersion, or break-up of drops, and coalescence, FIG. 1 shows these dispersion and coalescence steps schematically in an idealized way. In the dispersion step indicated by arrow 3, new, smaller drops 4 are continuously formed from larger drops 2 with the smaller drops having new fresh surface area between the reactants. In the coalescence step indicated by arrow 7, smaller drops 5 are brought together and join into larger drops 6 so that the reaction products can be mixed and withdrawn from the reaction zone.

The main forces that produce break-up or dispersion of drops in a flowing liquid are: local pressure fluctuations on account of turbulence; and shear forces adjacent to solid surfaces (that may either be moving or stationary). The main forces producing coalescence are: once again, pressure fluctuations due to natural turbulence that can propel the drops together; body forces such as gravity, which promote stratification and bringing together of the lighter component fluids, and fluid shear forces which can promote agglomeration or coalescence adjacent to a wall.

The role of dispersion in determining the overall reaction rate is well understood as being the creation of large amounts of fresh, new interfacial area between reactants (i.e. small drops). An appreciation of the importance of coalescence in determining the overall reaction rate can be gained by imagining the behavior of a drop with incremental steps in time as shown schematically in FIGS. 2a-2c. The situation illustrated is that of reaction products being much more soluble in the drop than in the continuous phase, as in the example generally of nitration of aromatic compounds in mixed acid.

Figure 2A:
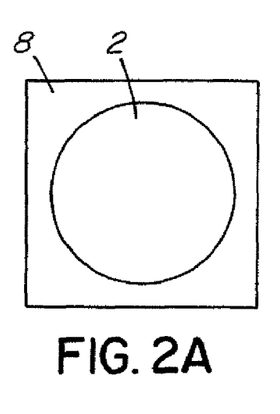
FIGS. 2a-2c show schematically the idealized sequential steps by which a drop is dispersed and coalesced to create increased surface area for further reaction.
Figure 2B:
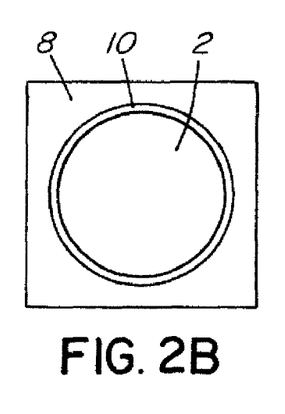

FIG. 2(a) shows an idealized drop 2 freshly introduced into a second surrounding reactant 8 before any reaction has occurred. As the reaction is understood to take place in a region of the continuous phase just beyond the surface of the drop, after a short period, reaction products are formed (indicated by the darker band 10 around the drop 2) as shown in FIG. 2(b). If the drop were completely immobile, the reaction products would slowly diffuse into the drop, while the unreacted material would diffuse to the drop surface and thereby react further.

Figure 2C:
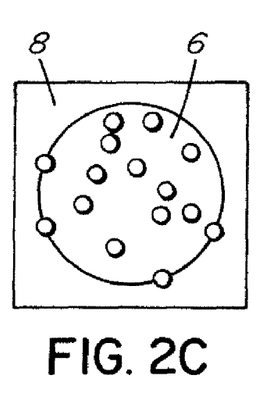

The role of coalescence is to accelerate the admixing of reacted with unreacted material by physically merging adjacent drops together. FIG. 2(c) shows the idealized situation after drops have coalesced, with reaction products 10 distributed throughout the unreacted material of a newly coalesced drop 6. Fresh unreacted material is now available at the drop surface to continue with the reaction.

It is appreciated that the description above is highly idealized, as the processes of dispersion and coalescence occur simultaneously in flowing liquid-liquid mixtures. New drops are continuously formed while old drops are merged by the combined actions of dispersion and coalescence, thereby sustaining the reaction. It becomes apparent however, that intensifying dispersion and coalescence phenomena can increase overall reaction rates.

Figure 3:
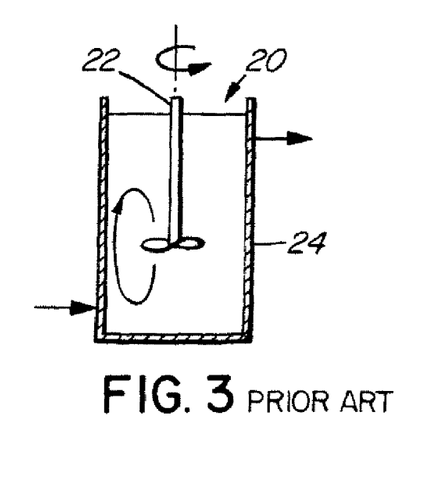
FIG. 3 is a schematic view showing a conventional continuously stirred tank reactor (CSTR)
Figure 4:
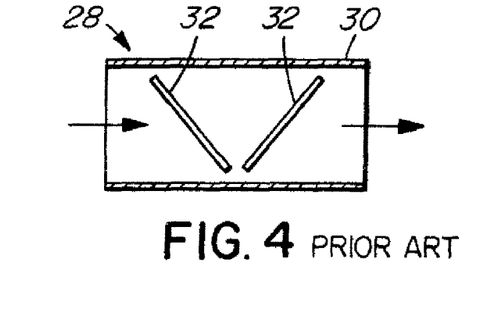
FIG. 4 is a schematic view showing a conventional pipe flow reactor (PFR)

Two conventional means for carrying out liquid-liquid reactions are in a so-called continuously stirred tank reactor 20 (CSTR), shown schematically in FIG. 3, or in a tubular, or pipe flow reactor 28 (PFR) shown in FIG. 4.

In the CSTR 20, a rotating impeller 22 imparts an overall circulation to the bulk fluid confined in a tank 24. While this can provide adequate mixing of miscible fluids, the situation with drops dispersed throughout a continuous fluid poses different issues. The greatest degree of dispersion occurs in the immediate vicinity of the rotating impeller as a result of the relatively high shear forces imparted by the moving surfaces. Although the bulk circulation is usually turbulent, drop dispersion rates are much lower in the bulk circulation than near the impeller. Turbulence in the bulk circulation however is responsible for most of the coalescence in the CSTR, and being relatively low, contributes to generally larger residence times being required to complete the reactions in a CSTR.

Pipe flow reactors (PFRs) 28, or in-line mixers as they are commonly called, have, as their name implies, the goal of mixing immiscible fluids together. Many examples of PFRs are in general industrial use. They generally comprise an enclosure 30 through reactants flow past insertable elements 32 which act to mix the flow. They often rely on a range of insertable elements 32 for use in different process and fluid conditions. Although certain specific types of elements can provide a modest degree of dispersion for immiscible drops, no particular amount of coalescence beyond that provided by the turbulent flow is achieved. Nevertheless this type mixer has been used as a reactor for nitrating benzene as described in European Patent Specification EP 0779270 B1 assigned to Mitsui Chemicals, Inc. The Mitsui patent describes nitration experiments with this type of reactor, and cites results that show high byproduct formation for instances having acceptable conversion rates of the incoming nitric acid. Conversely, the results showed low byproduct formation occurred at unacceptably low rates of nitric conversion.

Perhaps the first commercially successful reactor to deliberately use highly intensified dispersion zones is described in U.S. Pat. No. 4,994,242. The so-called jet-impingement reactor (assigned to Noram Engineering and Constructors Ltd.) uses a set of baffles, either flat, cylindrical or spherical having a series of holes allowing the passage of fluid. The intensified dispersion is achieved by high rates of shear generated in the flow as it passes adjacent to the sharp edge of a hole through the baffle. The holes in the adjacent baffles are slightly staggered in a lateral direction to avoid channeling through aligned holes, The high shear rates near the edge of the hole generate a high degree of dispersion as already mentioned, followed downstream by turbulent shear layers which merge into a turbulent jet. A certain degree of coalescence occurs in the jet downstream of a hole owing to the highly turbulent nature of the flow, but no other means are provided to intensify coalescence. In practice, a certain length of coalescing zone (usually a length of pipe) follows a set of baffles, typically 3-6 times the diameter of the baffles. Coalescence in this zone is generally low and is simply due to natural turbulence.

A reactor similar in design to the jet-impingement reactor is described in U.S. Pat. No. 6,506,949 issued Jan. 14, 2003 and assigned to Dow Global Technologies Inc. This reactor also uses a set of baffles with holes for drop dispersion, followed by sections of straight pipe to allow drop coalescence. A key feature distinguishing the Dow reactor from the Noram reactor is that the Dow design requires the reactor to be horizontal, whereas the Noram reactor can be arranged either horizontally or vertically. The baffle holes in the Dow reactor are located in the bottom part of the baffles. The claimed benefit of this arrangement when used for nitrating benzene in mixed acids is that, passing into a coalescence zone of straight pipe following a baffle, the benzene-MNB drops, being lighter than the surrounding mixed acid, will rise upward and coalesce in the upper portion of the pipe. As gravity is a relatively weak body force, a considerable length of pipe is needed to produce any significant coalescence (a most preferable coalescence zone length of 120 times the pipe diameter is cited in the Dow patent). This requirement leads to impractical reactor lengths and very long residence times, generally undesirable features.

SUMMARY OF THE INVENTION

To address the shortcomings of the prior art, the present invention makes use of the principle that reaction rates for heterogeneous reactions can generally be increased by promoting both dispersion and coalescence. In other words, by intensifying the principal processes that control the availability of fresh reactants to the reacting interface, reaction rates can be increased.

Accordingly, the present invention provides apparatus to allow chemical reactions between reactants comprising:

a vessel through which the reactants flow;
a baffle structure within the vessel to define at least one flow cell having an interior and at least one inlet to allow flow to pass into the cell interior as a jet to define a dispersion zone for the reactants, and an obstruction spaced from the at least one inlet to redirect the flow and form a coalescence zone for the reactants adjacent the obstruction, and at least one outlet to allow flow to exit the flow cell.

The present invention also provides apparatus to allow chemical reactions between reactants comprising:

a vessel through which the reactants flow including a first reactant distributed as drops throughout a second reactant;
a baffle structure within the vessel to define at least one flow cell having an interior and at least one inlet to allow flow to pass into the cell interior as a jet to define a dispersion zone for the drops, and an obstruction spaced from the at least one inlet to redirect the flow and form a coalescence zone for the drops, and at least one outlet to allow flow to exit the flow cell.

The present invention also provides apparatus to allow chemical reactions between reactants comprising:

a vessel through which the reactants flow including a first reactant distributed as drops throughout a second reactant; and
means for controlling the flow of reactants through the vessel to intensify the dispersion and coalescence of the drops comprising:
means for creating a zone of dispersion for the drops; and
means for creating a zone of coalescence for the drops.

In a further aspect, the present invention provides a method for promoting chemical reactions between reactants comprising:

delivering the reactants through a vessel in a mixed flow including a first reactant distributed as drops throughout a second reactant; and
controlling the flow through the vessel to create a flow path that alternates between dispersing the drops and coalescing the drops to increase the reaction rate.

The apparatus and method of the present invention provide benefits that include the likelihood of reduced reactor size and therefore capital costs, and perhaps more significantly, the possibility of reducing side reactions and byproduct formation. The apparatus to intensify dispersion and coalescence for reactant drops is achieved in simple reactors with no moving parts, having designs that avail themselves of simple methods of fabrication and requiring little or no maintenance.

BRIEF DESCRIPTION OF THE DRAWINGS

Aspects of the present invention are illustrated, merely by way of example, in the accompanying drawings in which.

DESCRIPTION OF THE PREFERRED EMBODIMENTS

The apparatus and method of the present invention rely on the principle of intensifying the dispersion and coalescence of the reactants to control the availability of fresh reactants to the reacting interface, and thereby increase the reaction rates for heterogeneous reactions.

The simplest and most practical means for producing intense dispersion is by creating a very highly sheared flow, as in the case of flow through a sharp edged orifice, slot, or hole in a baffle. This situation is well understood, and has previously been used in industrial applications. While many other means are also possible, this is the main principle used in the following reactor layouts.

Means to deliberately intensify coalescence have not been previously reported, despite the equal importance of coalescence in setting overall reaction rates. To see how simple fluid flow situations can be used to intensify coalescence, two main means, fluid body forces and fluid shear forces, are considered for the case of reacting drops dispersed throughout a second liquid reactant.

Figure 5A:
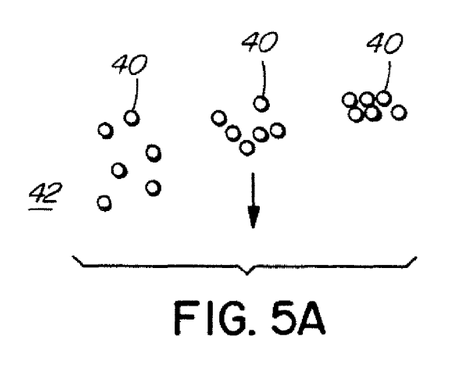
FIGS. 5a and 5b are schematic views showing how fluid body forces and fluid shear forces are used to promote coalescence of drops.

FIG. 5a illustrates schematically the case of fluid body forces where the drops 40 of a first reactant are lighter than the surrounding reactant fluid 42, for example, MNB/benzene drops in a mixed acid. The situation in FIG. 5(a) shows successive time intervals as the coalescence of drops 40 proceeds due to the buoyancy of the drops within reactant fluid 42. As the drops float upwardly within the reactant fluid against the force of gravity, the drops tend to group and combine together. The fluid body force of buoyancy due to gravity is a relatively weak force compared to centrifugal forces, for example. Simple turning or redirection of a flow can produce many 'g's of centrifugal force to increase coalescence of drops.

Figure 5B:
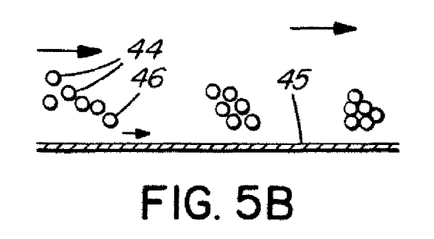

FIG. 5(b) shows a less appreciated means of coalescing drops using shear forces. A shear flow, in which drops 44 flowing further away from a solid surface 45 move faster than those closer to the surface, will coalesce drops as the slower drops 46 are overtaken and merge.

The design elements of importance in intensified process reactors are the creation of artificial body or centrifugal forces by turning the flow channels sharply, and providing solid surfaces to provide the maximum number of shear flows possible.

Figure 6:
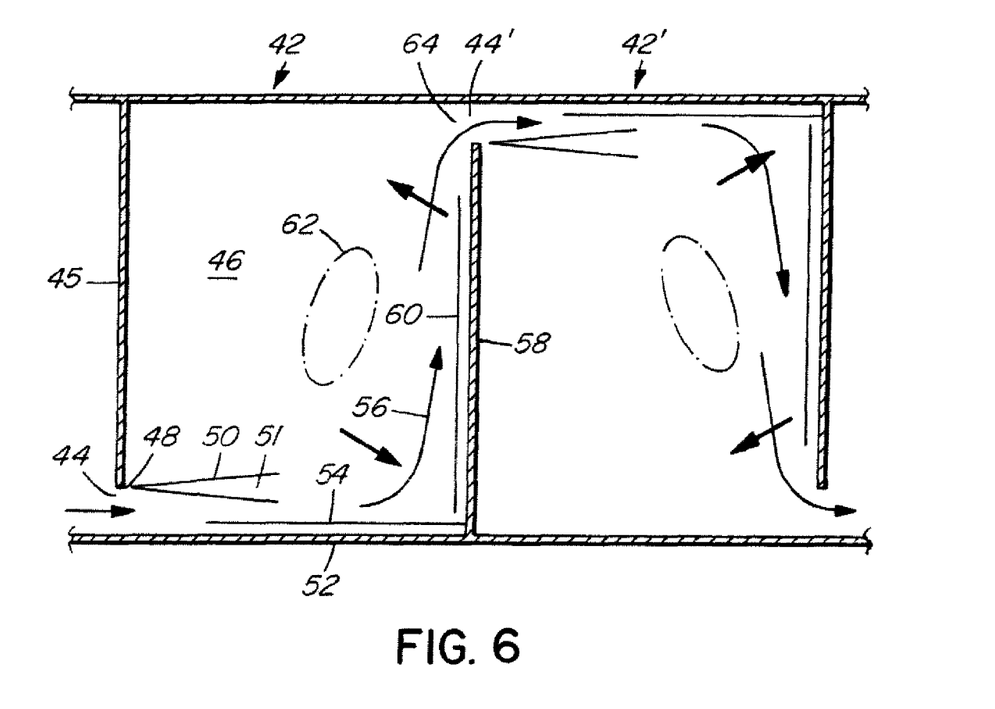
FIG. 6 is a schematic sectional view through a flow cell used in the apparatus of the present invention.

Bearing in mind the above dispersion and coalescence techniques, the apparatus of the present invention incorporates a unique flow cell structure that acts on reactants passing through the cell to disperse and coalesce drops of one reactant dispersed through a second reactant. FIG. 6 is a schematic view in cross-section of an exemplary flow cell according to the present invention.

FIG. 6 shows a sectional view through two cells 42, 42' that may be incorporated into a larger, repeated-cell structure. As will be explained in more detail below, cells 42 and 42' are positioned within a vessel through which reactants flow including a first reactant distributed as drops throughout a second reactant. Each cell acts as a means for controlling the flow of reactants to intensify the dispersion and coalescence of the drops, and each cell includes means for creating a zone of dispersion for the drops and means for creating a zone of coalescence for the drops. The means for forming zone of dispersion for the drops comprises at least one inlet 44 in a first end wall 45 of the cell that communicates with the interior 46 of cell 42. Inlet 44 is shaped to create a jet flow into the cell. As shown in FIG. 6, reactant flow enters cell 42 at the bottom left through inlet 44 which is preferably a slot with a sharp edge 48 to promote the formation of a downstream turbulent jet 50. Inlet 44 can also be formed as a plurality of discrete openings. Turbulent jet 50 creates a dispersion zone 51 of dispersed drops.

The means for creating a zone of coalescence for the drops comprises an obstruction in the form of second end wall 58. End wall 58 causes reactant flow to turn sharply to the flow direction of jet 50. Preferably, second end wall 58 is positioned to redirect flow essentially transversely to the flow of the jet as indicated by arrow 56. This results in the reactant flow encountering shear flow along second end wall 58 to create a coalescence zone 60 along the end wall. Turning the flow through a sharp corner also produces a strong centrifugal force, which in turn coalesces the drops further away from end wall 58 and forms a richly coalesced zone 62 in the central region of the cell interior 46 due to body fluid forces.

An additional zone of intense coalescence 54 due to shear forces is also created as the jet 50 of reactant flow passes along side wall 52 of the cell. Coalescence zone 54 is, in fact, more intense than the coalescence shear zone 60 along second end wall 58, and is not found in prior art jet impingement reactors.

As reactant flow continues along second end wall 58, it encounters an outlet 64 for cell 42 which also serves as the inlet 44' into the next flow cell 42'. Outlet 64/inlet 44' is also preferably a slot. The reactant flow turns sharply through inlet 44' into the second cell, and the flow pattern with associated dispersion and coalescence zones is repeated. The sharp turn into outlet 64/inlet 44' further coalesces the lighter drops in the upper-central region of cell 42.

It will be noted that the basic cell discussed above serves to intensify dispersion and coalescence in cases where the dispersed drops of the first reactant are lighter or heavier than the conveying fluid of the second reactant. The case for lighter drops is described above. In the case of the drops being heavier than the conveying fluid, for example, in a gas carrying drops of a heavy hydrocarbon, it can easily be seen that the sharp turns within the cell will cause the heavier drops to flow outward and impact the walls of the cell, where the shear forces will form the drops into thin films flowing along the wall, producing intense coalescence within the film before their re-dispersion at the next sharp inlet edge.

Figure 7:
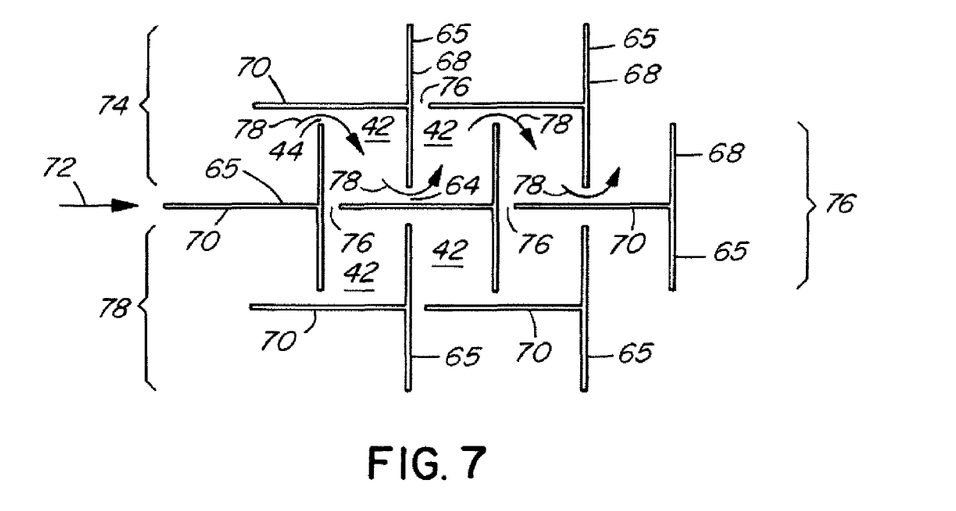
FIG. 7 is a schematic cross-sectional view showing a preferred arrangement of generally T-shaped members to create an array of flow cells.

Practical constructions that emulate the basic flow cell structure 42 described above can be arranged in many ways by a person skilled in the art. A preferred arrangement that allows for the basic cell structure to be repeated in an array of interconnected cells is shown in FIG. 7. An array of flow cells 42 is formed from a series of members 65, each member having a generally "T" shaped cross-section, arranged in a repeating pattern. Each member 65 of generally T-shaped cross-section has a head portion 68 and a base portion 70, and each member is positioned such that head portion 68 is aligned transversely to a flow of reactants indicated by arrow 72, and the base portion 70 is aligned parallel to the flow. The members 65 are arranged in a plurality of parallel rows 74, 76, 78 that extend in the direction of reactant flow with every other row being offset such that the base portion 70 of one member in an intermediate row 76 extends between the head portions 68 of other members in adjacent rows 74 and 78. In this arrangement, the head portions 68 and base portions 70 of pairs of offset members 65 in adjacent rows co-operate to form the end walls and side walls, respectively, of a flow cell. Gaps between the head portions and the base portions of members 65 in adjacent rows create the inlets 44 and outlets 64 of the cells such that the second end wall and outlet of one cell forms the first end wall and inlet of a subsequent, adjacent flow cell. The cells in FIG. 7 have an additional gap 76 in their upper left-hand corner due to a spacing between the members 65 in each row, however, this is a region of little, or no flow, so the flow pattern described above and indicated generally by arrows 78 is maintained with resulting zones of intensified dispersion and coalescence in each flow cell 42.

Figure 8A:
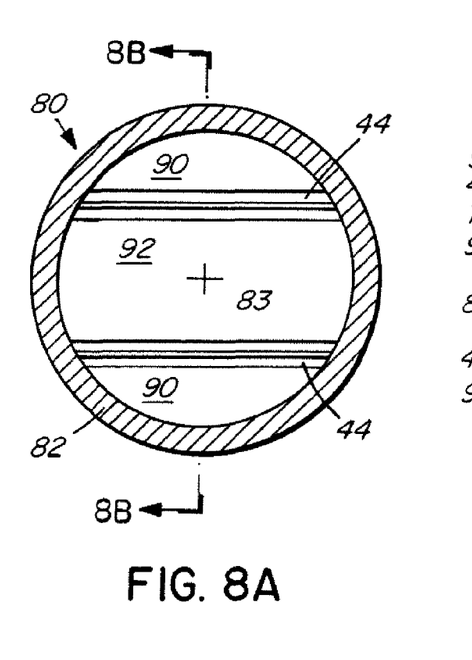
FIGS. 8a and 8b are schematic views showing a reactor vessel incorporating generally linear flow cells with linear slotted inlets.
Figure 8B:
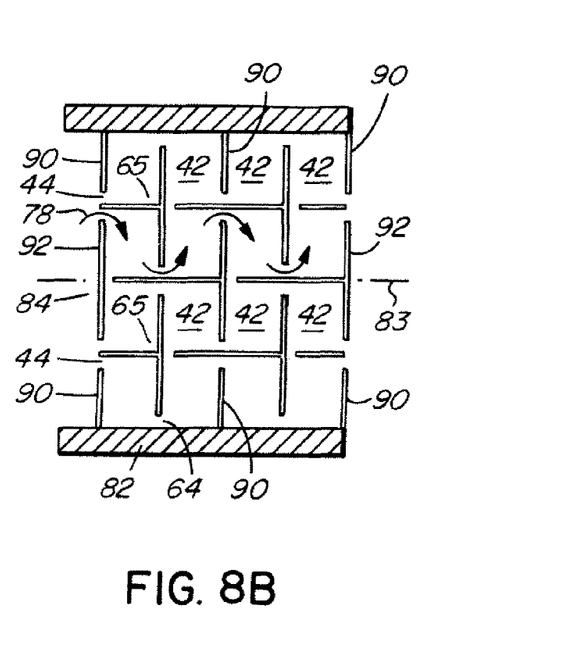

As shown in FIGS. 8a and 8b, a reactor according to the present invention is readily created by arranging the flow cells described above within a vessel 80. In a preferred embodiment, the vessel is a hollow body such as a pipe having a cylindrical side wall 82 and a longitudinal axis 83. The reactants flow through the pipe and encounter flow cells 42 formed internally within the pipe interior 84. In the embodiment of FIGS. 8a and 8b, flow cells 42 are formed by a baffle structure 86 that includes T-shaped members 65 arranged in a repeating pattern, as described above in conjunction with FIG. 7. The repeating pattern extends along the longitudinal axis 83 of the vessel such that the T-shaped members 65 define an array of interconnected flow cells 42 that communicate with each other by virtue of the outlet of one flow cell being the inlet of one or more other flow cells as shown in FIG. 8b which is a cross-section taken along line 8b-8b of FIG. 8a. As best shown in FIG. 8a, which is an end view of the pipe reactor, the T-shaped members extend transversely between the side wall 82 of the pipe to define linear slotted inlets 44 to each flow cell that also extend across the pipe. This configuration provides a maximum length of sharp edge for dispersion of the drops when compared with holes or other rounded shapes having the same amount of open area for flow (an important concern that governs pressure drop across the baffle). As necessary, baffle pieces, shaped in appropriate partial circular segments are used to complete the array of T-shaped members 65. In particular, segment pieces 90 and 92 are used at the ends of a grouping of to complete the flow cells. Segment pieces 90 are also employed within an array of T-shaped members 65 to complete the array adjacent pipe side wall 82.

The basic "T" members 65 can be repeated along a sufficient length of pipe in the longitudinal direction so that complete conversion of the reactants may be accomplished. Reactants flowing through the reactor alternate between zones of dispersion and zones of coalescence as they move through the interconnected flow cells 42 in the general flow pattern indicated by arrows 78 in FIG. 8b. The relative dimensions shown in FIGS. 8a and 8b are only meant to convey the concepts and would not necessarily be those used in industrial practice. For example, in a MNB production reactor, the cells might typically be 3-6 cm across, and there may be from 10-20 cells arranged across the circular cross-section of the reactor. The opening slots could be 2-6 mm wide, and the overall reactor length might be from 3-6 m.

Figure 9A:
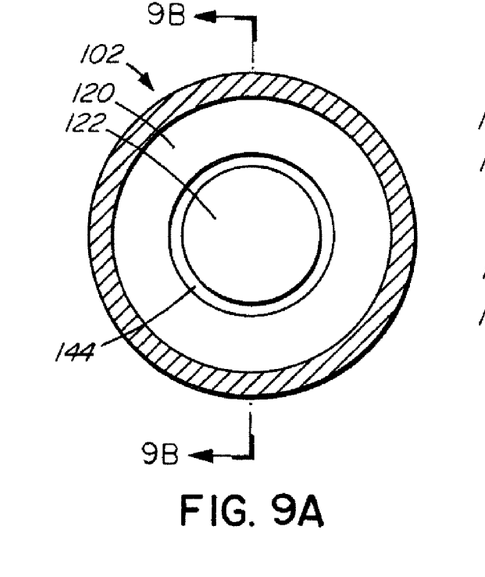
FIGS. 9a and 9b are schematic views showing another embodiment of a reactor vessel having annular flow cells with annular slotted inlets.
Figure 9B:
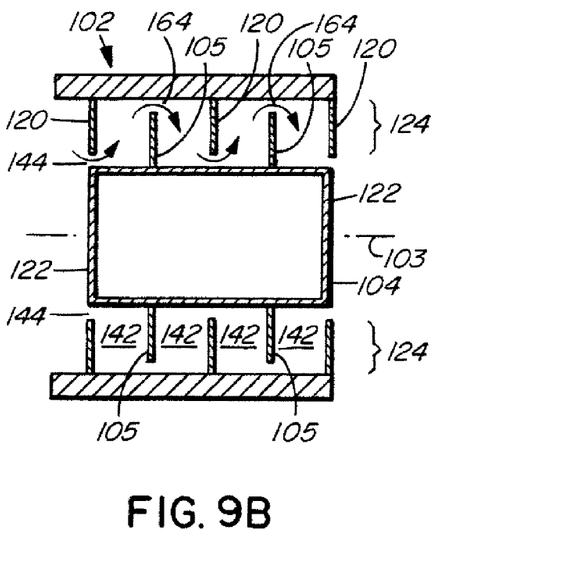

FIGS. 9a and 9b show an alternative arrangement of flow cells according to another embodiment of the reactor of the present invention. Once again, the reactor vessel is a hollow body, such as a pipe section, having a cylindrical side wall 102 and a longitudinal axis 103. In this arrangement, the flow cells are of an annular configuration formed from a plurality of spaced, annular elements aligned along the axis 103 of the pipe. There is a cylindrical core element 104 positioned along axis 103 having sealed ends 122 as best shown in FIG. 9b which is a section view taken along line 9b-9b of FIG. 9a. Annular ring elements 105 extend radially outwardly from core element 104 toward side wall 102 at spaced intervals. Similarly, annular ring elements 120 extend radially inwardly from side wall 102 toward core element 104 at spaced intervals. Annular ring elements 105 and 120 overlap within an annular perimeter space 124 within the interior of the hollow body to define a plurality of interconnected annular flow cells 142 having annular inlets 144 and annular outlets 164.

The arrangement shown in FIGS. 9a and 9b is easily assembled. The relative dimensions shown are only intended to convey the concept with clarity, and would not necessarily represent dimensions used in industrial practice. The comments above regarding typical dimensions for the reactor embodiment of FIGS. 8a and 8b equally apply to the reactor arrangement of FIGS. 9a and 9b.

Figure 10:
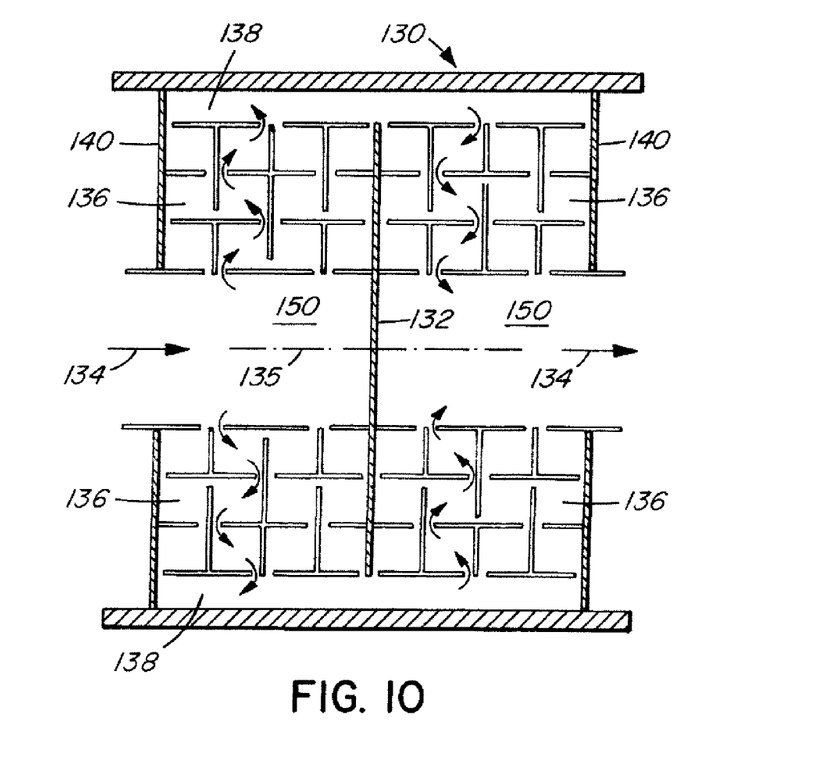
FIG. 10 is a schematic, cross-sectional view showing a further embodiment of a reactor vessel having flow cells arranged to intercept radially directed flow within a reactor.

FIG. 10 shows a still further arrangement of a reactor according to the present invention in which the flow cell structure to create alternating dispersion and coalescence of drops within the reactant flow is positioned circumferentially about the interior of the reactor 130 to handle radially directed flow. FIG. 10 is a cross-sectional view through the reactor 130 and illustrates one portion of reactor, it being understood that identical portions are repeated along the full length of the reactor. In the arrangement of FIG. 10, a baffle plate 132 blocks the axial flow 134 of reactants along longitudinal axis 135 forcing the flow radially outwardly through annular flow cell structure 136 which has inlets and outlets oriented to permit radial flow through the cells. Passing through an annular perimeter channel 138, the reactant flow then returns radially inwardly to the center of reactor 130 to flow along reactor axis 135 again.

Reactor 130 comprises a hollow body formed with a plurality of internal baffles extending transversely to the longitudinal axis 135 to restrict axial flow 134. In addition to baffle 132 which is preferably a disc shaped plate positioned in the centre of the reactor to blocking axial flow, the interior of the reactor also includes a pair of annular baffle plates 140 spaced along the longitudinal axis of the reactor on either side of baffle 132. Baffles 132 and 140 define a series of interrupted central channels 150 for reactant flow extending between pairs of disc baffles 132, and a series of interrupted annular perimeter channels 138 for reactant flow extending between pairs of annular baffle plates 140. Interrupted channels 150 and 138 communicate through the arrays 136 of flow cells extending between adjacent overlapping plate surfaces.

Figure 11A:
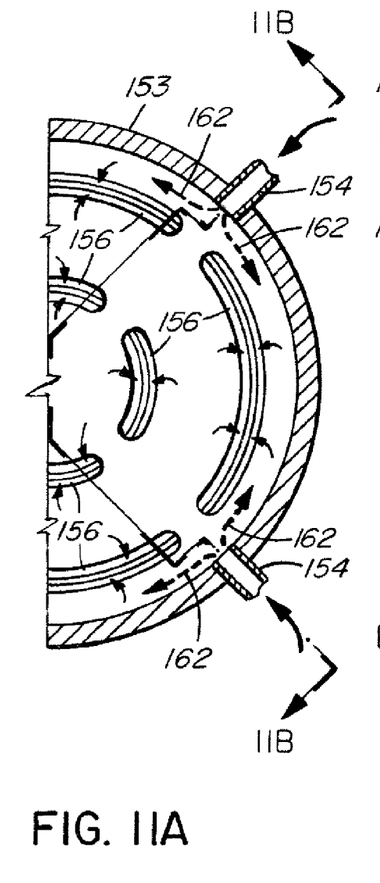
FIGS. 11a to 11c show a still further embodiment of a reactor vessel according to the present invention having annular flow cells and an inlet arrangement for introducing one or more reactants.
Figure 11B:
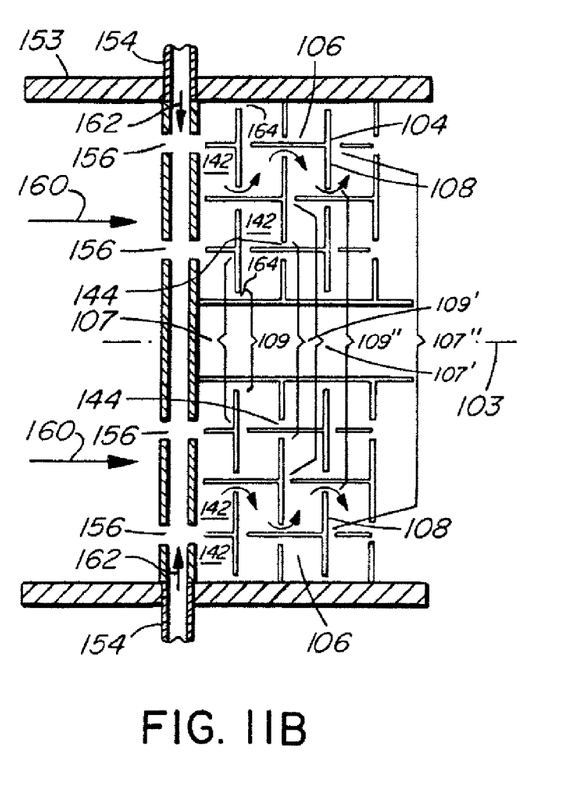
Figure 11C:
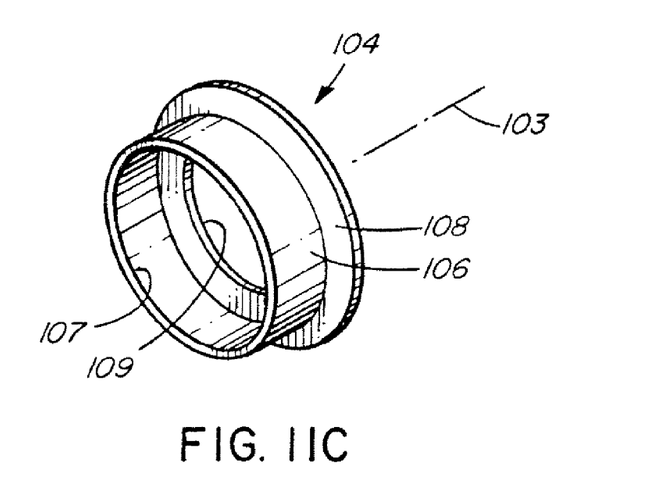

All of the above-described reactor embodiments are intended to operate in an environment where the reactants are mixed prior to introduction into the reactor. FIGS. 11a to 11c show another arrangement of a reactor according to the present invention which also includes one or more vessel inlets 151 into the vessel 152 for introducing at least one of the reactants.

FIGS. 11a and 11b show a hollow body reactor vessel 152, such as a pipe section, having a cylindrical side wall 153 and a longitudinal axis 103. In this reactor, the flow cells are of an annular configuration formed from a plurality of ring cell elements aligned along the axis 103 of the pipe section. FIG. 11c shows in detail an exemplary ring cell element 104 positioned about axis 103, and formed from a cylindrical member 106 having an opening 107 therethrough of a first diameter, and an annular disc member 108 having a central opening of a second diameter 109, less than the first diameter, positioned against an end of the cylindrical member. As best shown in FIG. 11b, which is a cross-sectional view through the reactor taken along line 11b-11b of FIG. 11a, each ring cell element 104 defines a pair of "T" shaped elements spaced equidistantly apart about axis 103. Groups of ring cell elements 104 of different diameters are inserted into hollow body 153 in a repeating, nested pattern along longitudinal axis 103 to define an array of interconnected flow cells 142 of annular configuration. For example, in the illustrated reactor of FIG. 11b, three groups of ring cell elements 104 are used with each group having a different first diameter for opening 107, 107' or 107" all centered about axis 103. Each annular flow cell 142 defined by the ring cell elements 104 includes an annular inlet 144 and annular outlet 164 formed generally by the gap between the disc member 108 of one ring cell element and the cylinder member 106 of an adjacent ring cell element.

The arrangement shown in FIGS. 11a-11d is easily assembled. The relative dimensions shown are only intended to convey the concept with clarity, and would not necessarily represent dimensions used in industrial practice.

While the reactor embodiment of FIGS. 11a to 11c is also shown to include vessel inlets 151, it will be understood that inlets 151 can be incorporated into any of the previously described reactor designs. Each vessel inlet 151 comprises at least one pipe 154 extending radially into vessel 152. Pipe 154 includes openings 156 to introduce one or more reactants into the other reactants which are already flowing through the vessel. Openings 156 can be positioned to introduce one or more reactants into multiple flow cells simultaneously. For example, in the nitration of benzene, a nitric-sulfuric acid mix would flow through the reactor as indicated by arrow 160 and benzene would be introduced into the reactor via inlet pipe 154 as indicated by arrow 162 to form mononitrobenzene (MNB), a precursor in the production of polyurethanes, among other important products.

The flow cell arrangements described above are not an exhaustive collection, but are merely intended to illustrate means for achieving intensified dispersion and coalescence in practical arrangements according to the spirit of the present invention. Other flow cell arrangements that alternate between dispersion and coalescence of reactant drops will be apparent to a person skilled in the art. Actual dimensions, number of cells, and overall configuration would be suited to production rates and other process considerations.

The intensified dispersion and coalescence processes previously described can be effected in a variety of geometrical arrangements, each leading to greater or lesser degrees of intensification or coalescence. Each geometrical arrangement in turn presents unique fabrication challenges, so that trade-offs are required with different mechanical designs.

Figure 12:
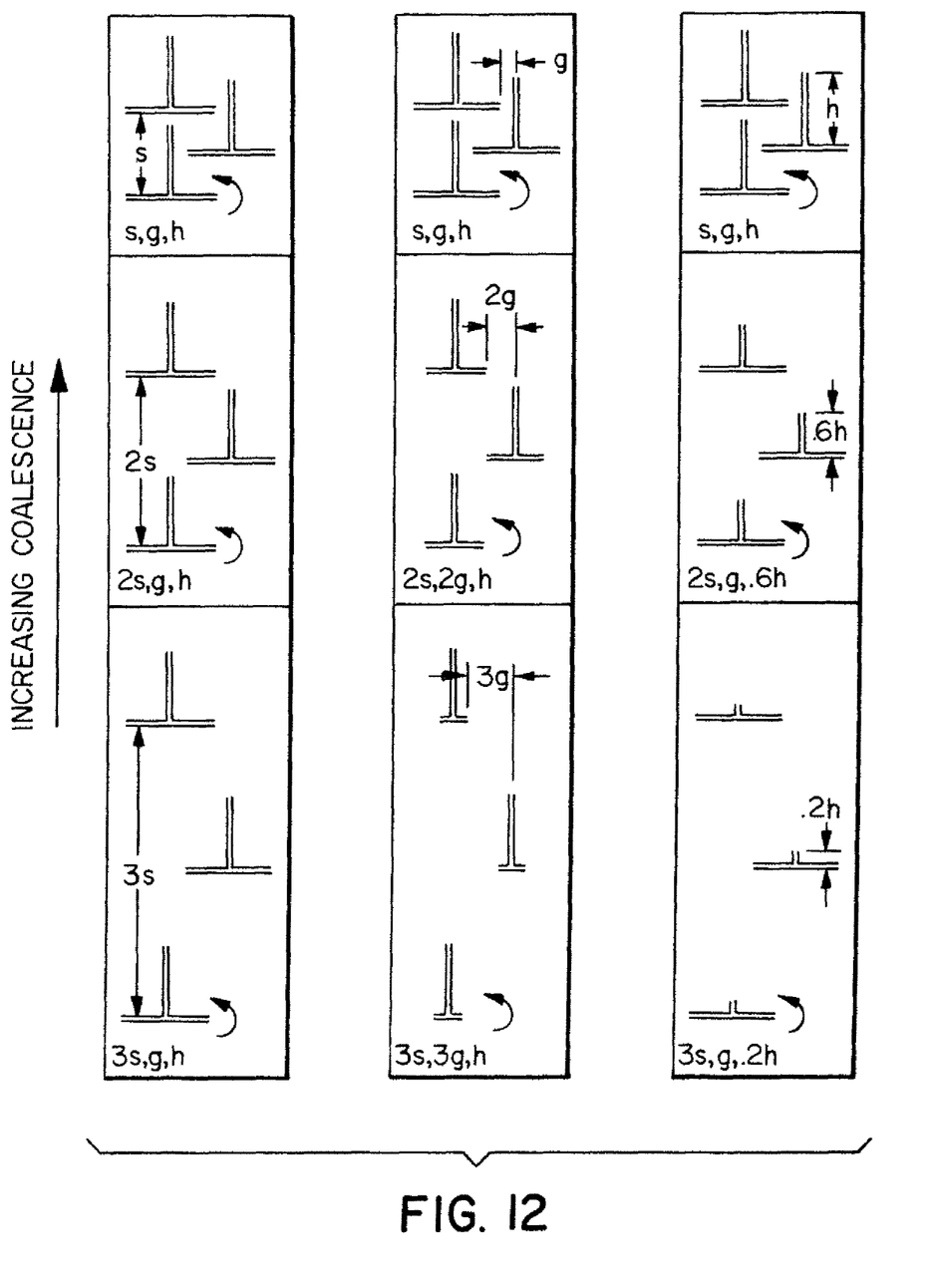
FIG. 12 is a chart showing the effect of changing cell spacing, gap and element height in a reactor according to the present invention.

Specific arrangements of the flow cell spacing, gaps and element heights/widths can have a profound influence on the relative amount of dispersion and coalescence generated within. FIG. 12 is a chart showing a paradigm of (two dimensional) cell designs; the left column shows the result of increases in cell spacing (s) (the distance between the first and second end walls), the middle column shows the effect of cell gap (g) which affects the dimensions of the cell inlet or outlet, and the right column shows the effect of changing the height (h) of the side walls of the cell.

The upper left hand panel (marked s, g, h) can be expected to have the highest degree of both coalescence and dispersion owing to the sharp changes in flow direction, the highest ratio of cell wall to volume, and the narrowest fluid gaps. Correspondingly, panel (3s, g, 0.2h) in the lower right hand corner represents an arrangement with less intense dispersion and coalescence.

While cell (s, g, h) could be assembled from a series of "T"-bar shapes or ring elements as previously described, cells of the (3s, 3g, h) and (3s, g, 0.2h) type could be made much more simply. For illustration, two further different designs are described below.

High Dispersion

Figure 13:
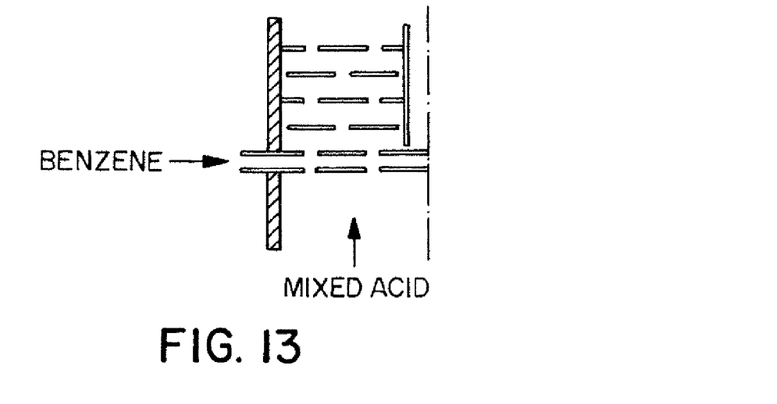
FIGS. 13 to 17 show various alternative reactor designs.

A flow cell of the (3s, g, 0.2h) type in the limiting case can be incorporated into a simple reactor as shown in FIG. 13.

This design emulates the well-known "jet-impingement" reactor with good dispersion characteristics. It also has the benefit of potentially increased dispersion (owing to slots, rather than holes) for the same pressure drop (open area). To a certain extent coalescence can be improved by varying spacing between plates. Great practical benefit arises from a single diameter pipe enclosure, with a minimum number of gaskets, joints and other potential leak points.

High Coalescence

Figure 14:
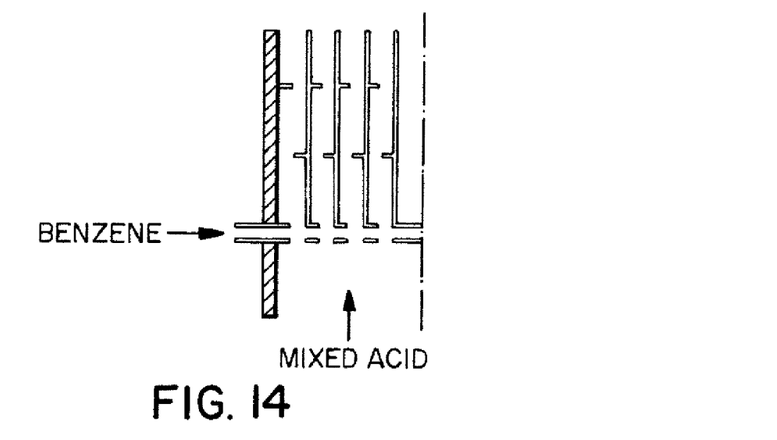

Arranging the cells as (3s, 3g, h), with some compaction in dimensions, results in a reactor geometry as shown in FIG. 14. The long parallel flow channels will result in relatively greater tendency for shear-flow induced coalescence, while maintaining some degree of dispersion as a result of the periodic cross-struts along the flow. This design has the potential of lower overall pressure drop being required.

High Dispersion, Modest Coalescence

Figure 15:
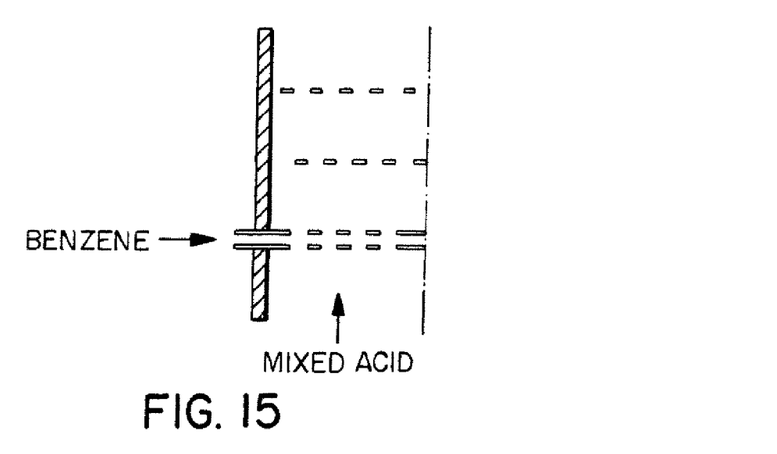

The (3s, 3g, h) cell in FIG. 14 can be further extended to a very simple design incorporating a series of slotted plates as shown in FIG. 15.

Figure 16:
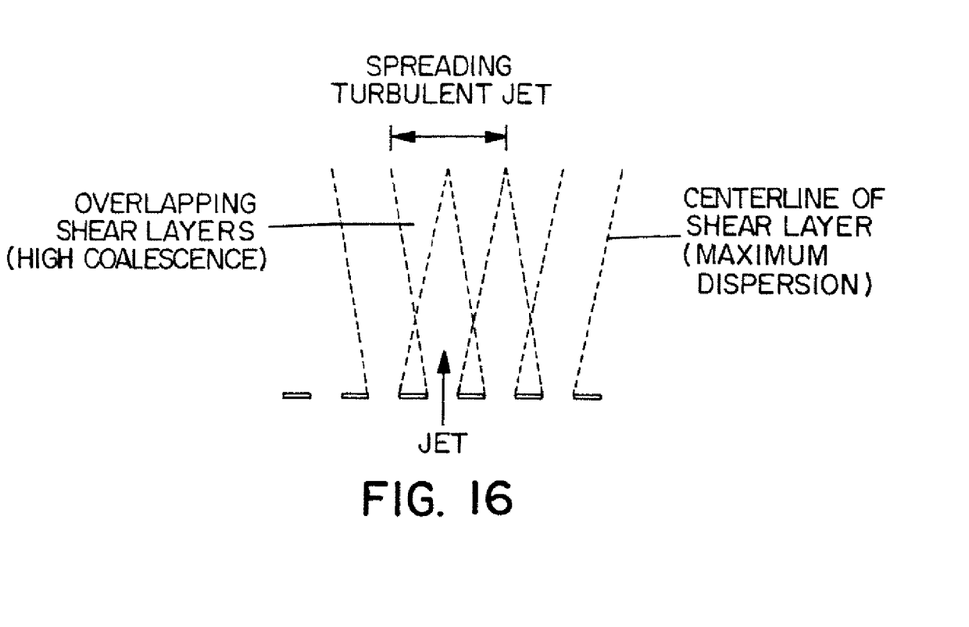

The expected fluid flow behavior in such a simple reactor can be appreciated from FIG. 16. Each turbulent jet issues from a slot and spreads at an included angle of approximately 17 degrees. The edge of the spreading jet is a region of high shear, and therefore high dispersion. In the region of shear layers overlapping, the turbulence level will be further increased, with the potential increase in coalescence.

It might be noted that the geometry shown in FIGS. 15 and 16 also has the potential for moderate pressure drop, since the area open to the flow can easily be as high as 50%.

Figure 17:
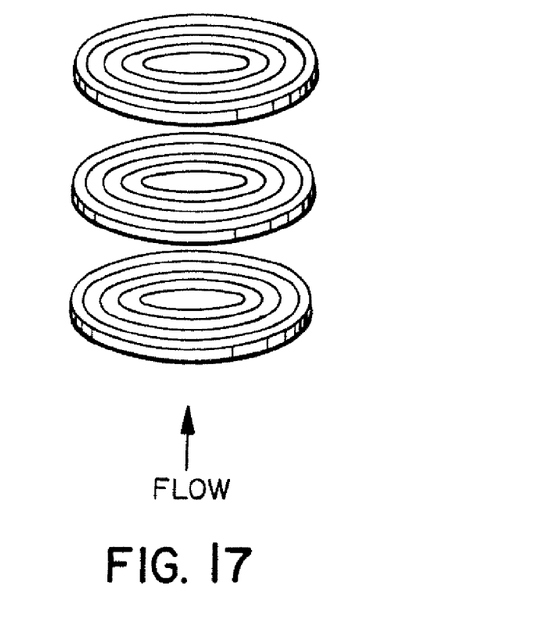

Further, owing to the geometry of the spreading jets, the optimum spacing between slotted plates is a function of slot width, and so can be estimated beforehand. Fairly compact reactors are envisioned. FIG. 17 shows as an illustration a typical plate spacing/reactor diameter geometry.

Although the present invention has been described in some detail by way of example for purposes of clarity and understanding, it will be apparent that certain changes and modifications may be practised within the scope of the appended claims.

I claim:

1. An apparatus to allow chemical reactions between reactants comprising:
   a vessel through which the reactants flow co-currently;
   a baffle structure within the vessel to define a plurality of flow cells, each flow cell having an interior and at least one inlet to allow flow to pass into the cell interior as a jet to define a dispersion zone for the reactants, and an obstruction spaced from the at least one inlet to redirect the flow and form a coalescence zone for the reactants adjacent the obstruction, and at least one outlet to allow flow to exit the flow cell;
   a vessel inlet for introducing at least one reactant into the vessel having multiple openings to introduce the at least one reactant into other reactants already flowing through the vessel, the openings being positioned to introduce the at least one reactant into multiple flow cells.

2. The apparatus as claimed in claim 1 in which the obstruction is positioned to redirect flow essentially transversely to the flow of the jet such that the obstruction imparts a shearing action to the flow and imparts centrifugal forces to the flow to cause coalescence.

3. The apparatus as claimed in claim 1 in which each of the plurality of flow cells has a first end wall formed with the at least one inlet, a second end wall defining the obstruction formed with the at least one outlet, and side walls extending past the first and second end walls, the second end wall with the at least one outlet of one of the plurality of flow cells forming the first end wall and inlet of a subsequent, adjacent flow cell.

4. The apparatus as claimed in claim 3 in which the side wall in proximity to the inlet defines an additional coalescence zone for the reactants.

5. The apparatus as claimed in claim 3 in which the flow cells are arranged to extend along a longitudinal axis of the vessel.

6. The apparatus as claimed in claim 5 in which the flow cells are arranged to extend radially from the longitudinal axis of the vessel.

7. The apparatus as claimed in claim 1 in which the at least one inlet and outlet comprises a slot.

8. The apparatus as claimed in claim 1 in which the at least one inlet and outlet comprises a plurality of discrete openings.

9. The apparatus as claimed in claim 1 in which the vessel comprises a hollow body having a longitudinal axis, and the baffle structure is formed from a plurality of elements arranged within the body to define an array of interconnected flow cells that communicate with each other by virtue of the outlet of one flow cell being the inlet of one or more other flow cells.

10. The apparatus as claimed in claim 9 in which the plurality of elements includes members of generally T-shaped cross-section, the members being arranged through the hollow body in a repeating pattern to define the array of interconnected flow cells.

11. The apparatus as claimed in claim 10 in which the hollow body includes outer side walls and the elements extend between the outer sidewalls to define linear slot inlets and outlets to each flow cell that extend transversely to the longitudinal axis between the side walls.

12. The apparatus as claimed in claim 11 in which each member of generally T-shaped cross-section has a head portion and a base portion, and each member is positioned such that the head portion is aligned transversely to the longitudinal axis of the hollow body and the base portion is aligned parallel to the longitudinal axis, the members being arranged in a plurality of parallel rows extending along the longitudinal axis of the hollow body with every second row being offset such that the base portion of one member in an intermediate row extends between the head portions of other members in adjacent rows.

13. The apparatus as claimed in claim 9 in which the plurality of elements includes a central core element of cylindrical configuration aligned along the longitudinal axis of the hollow body having a plurality of spaced first annular elements extending radially outwardly from the core element and a plurality of spaced second annular elements extending radially inwardly from the hollow body, the first and second annular elements co-operating to define a plurality of interconnected flow cells of annular configuration within an annular space about the central core element.

14. The apparatus as claimed in claim 9 in which the plurality of elements includes:
   a ring cell element comprising an annular cylindrical member having an opening therethrough of a first diameter and an annular disc member having a central opening of a second diameter less than the first diameter positioned against an end of the annular cylindrical member;
   a plurality of the ring cell elements of different first diameters being arranged through the hollow body centered about the longitudinal axis in a repeating pattern to define an array interconnected annular flow cells.

15. The apparatus as claimed in claim 1 in which the vessel comprises a hollow body having a longitudinal axis and formed with a plurality of internal baffles extending transversely to the longitudinal axis to restrict axial flow and direct flow radially within the body with an array of flow cells extending between adjacent baffles, the flow cells having inlets amid outlets oriented to permit radial flow through the cells.

16. The apparatus as claimed in claim 15 in which the internal baffles comprise alternating disc plates and annular plates spaced along the longitudinal axis of the hollow body to define a series of interrupted central channels for flow extending between pairs of disc plates and a series of interrupted annular perimeter channels for flow extending between pairs of annular plates, the interrupted channels communicating through arrays of flow cells extending between adjacent overlapping plate surfaces in an annular configuration, whereby flow through the hollow body is directed longitudinally along a central channel, radially outwardly through one of the arrays of flow cells, longitudinally along an annular perimeter channel, and radially inwardly through another of the arrays of flow cells.

17. The apparatus as claimed in claim 1 in which the vessel inlet comprises at least one pipe extending radially into the vessel formed with the multiple openings.

18. A method for promoting chemical reactions between reactants comprising:
   delivering the reactants through a vessel in a mixed co-current flow including a first reactant distributed as drops throughout a second reactant; and
   controlling the flow through the vessel to create a flow path that alternates between dispersing the drops and coalescing the drops to increase the reaction rate by directing the flow through at least one flow cell in the vessel, the flow cell having at least one inlet to allow flow to pass through the inlet as a jet to define a dispersion zone for the drops. and an obstruction spaced from the at least one inlet to redirect the flow and form a coalescence zone for the drops within an interior of the flow cell adjacent the obstruction, and at least one outlet adjacent the obstruction to allow flow to exit the flow cell, wherein the at least one flow cell is arranged in an array of a plurality of flow cells within the vessel positioned to intercept and control flow through the vessel.

19. The method of claim 18 including a side wall in proximity to the jet to provide an additional zone of coalescence of the drops due to fluid shear forces at the side wall.

20. The method of claim 18 in which the first and second reactants are liquids, with the drops of the first liquid reactant being distributed throughout the second reactant.

21. The method of claim 18 in which the first reactant is a liquid, and the second reactant is a moving gas stream.

22. An apparatus to allow chemical reactions between reactants comprising:
a vessel through which the reactants flow co-currently, the vessel comprising a hollow body having a longitudinal axis;
a baffle structure within the vessel to define at least one flow cell having an interior and at least one inlet to allow flow to pass into the cell interior as a jet to define a dispersion zone for the reactants, and an obstruction spaced from the at least one inlet to redirect the flow and form a coalescence zone for the reactants adjacent the obstruction, and at least one outlet to allow flow to exit the flow cell,
wherein the baffle structure is formed from a plurality of elements arranged within the body to define an array of interconnected flow cells that communicate with each other by virtue of the outlet of one flow cell being the inlet of one or more other flow cells, and the plurality of elements includes members of generally T-shaped cross-section, the members being arranged through the hollow body in a repeating pattern to define the array of interconnected flow cells.

23. An apparatus to allow chemical reactions between reactants comprising:
a vessel through which the reactants flow co-currently, the vessel comprising a hollow body having a longitudinal axis;
a baffle structure within the vessel to define at least one flow cell having an interior and at least one inlet to allow flow to pass into the cell interior as a jet to define a dispersion zone for the reactants, and an obstruction spaced from the at least one inlet to redirect the flow and form a coalescence zone for the reactants adjacent the obstruction, and at least one outlet to allow flow to exit the flow cell,
wherein the baffle structure is formed from a plurality of elements arranged within the body to define an array of interconnected flow cells that communicate with each other by virtue of the outlet of one flow cell being the inlet of one or more other flow cells, and the plurality of elements includes a central core element of cylindrical configuration aligned along the longitudinal axis of the hollow body having a plurality of spaced first annular elements extending radially outwardly from the core element and a plurality of spaced second annular elements extending radially inwardly from the hollow body, the first and second annular elements co-operating to define a plurality of interconnected flow cells of annular configuration within an annular space about the central core element.

24. An apparatus to allow chemical reactions between reactants comprising:
a vessel through which the reactants flow co-currently, the vessel comprising a hollow body having a longitudinal axis;
a baffle structure within the vessel to define at least one flow cell having an interior and at least one inlet to allow flow to pass into the cell interior as a jet to define a dispersion zone for the reactants, and an obstruction spaced from the at least one inlet to redirect the flow and form a coalescence zone for the reactants adjacent the obstruction, and at least one outlet to allow flow to exit the flow cell,
wherein the baffle structure is formed from a plurality of elements arranged within the body to define an array of interconnected flow cells that communicate with each other by virtue of the outlet of one flow cell being the inlet of one or more other flow cells, and the plurality of elements includes:
a ring cell element comprising an annular cylindrical member having an opening therethrough of a first diameter and an annular disc member having a central opening of a second diameter less than the first diameter positioned against an end of the annular cylindrical member;
a plurality of the ring cell elements of different first diameters being arranged through the hollow body centered about the longitudinal axis in a repeating pattern to define an array interconnected annular flow cells.

25. An apparatus to allow chemical reactions between reactants comprising:
a vessel through which the reactants flow co-currently, the vessel comprising a hollow body having a longitudinal axis;
a baffle structure within the vessel to define at least one flow cell having an interior and at least one inlet to allow flow to pass into the cell interior as a jet to define a dispersion zone for the reactants, and an obstruction spaced from the at least one inlet to redirect the flow and form a coalescence zone for the reactants adjacent the obstruction, and at least one outlet to allow flow to exit the flow cell,
wherein the baffle structure is formed from a plurality of internal baffles extending transversely to the longitudinal axis to restrict axial flow and direct flow radially within the body with an array of flow cells extending between adjacent baffles, the flow cells having inlets and outlets oriented to permit radial flow through the cells; and
wherein the internal baffles comprise alternating disc plates and annular plates spaced along the longitudinal axis of the hollow body to define a series of interrupted central channels for flow extending between pairs of disc plates and a series of interrupted annular perimeter channels for flow extending between pairs of annular plates, the interrupted channels communicating through arrays of flow cells extending between adjacent overlapping plate surfaces in an annular configuration, whereby flow through the hollow body is directed longitudinally along a central channel, radially outwardly through one of the arrays of flow cells, longitudinally along an annular perimeter channel, and radially inwardly through another of the arrays of flow cells.

* * * * *